Figure 1:
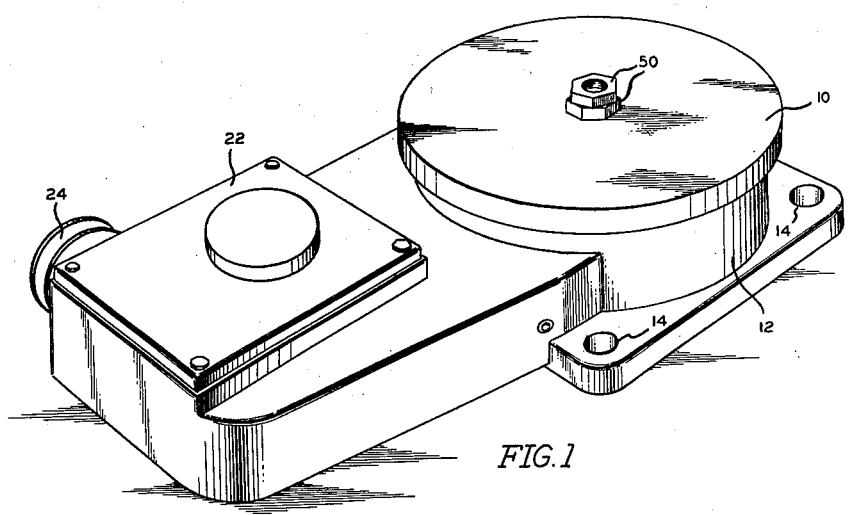

Sept. 17, 1963 R. W. BRYANT 3,103,825
INDEX TABLE
Filed Dec. 19, 1960 2 Sheets-Sheet 1

INVENTOR
RAYMOND W. BRYANT
BY Beaman & Beaman
ATTORNEY

Sept. 17, 1963  R. W. BRYANT  3,103,825
INDEX TABLE

Filed Dec. 19, 1960  2 Sheets-Sheet 2

INVENTOR
RAYMOND W. BRYANT
BY Beaman & Beaman
ATTORNEY

United States Patent Office 3,103,825
Patented Sept. 17, 1963

3,103,825
INDEX TABLE
Raymond W. Bryant, Jackson, Mich., assignor to Lloyd W. Jeffries, doing business as Jackson Fluid Power Company, Detroit, Mich.
Filed Dec. 19, 1960, Ser. No. 76,952
5 Claims. (Cl. 74—116)

The invention relates to indexing apparatus and is particularly concerned with indexing devices as used with index tables.

Index tables are commonly employed in many manufacturing processes wherein it is desired to index a tool holder, jig, workpiece holder, etc. sequentially about a circular path, each stop of the index table constituting a station for loading, unloading, machining, etc. The invention is concerned with index devices of this type wherein the power supplied to rotate the table is derived from a continuously unidirectionally rotating drive shaft. Indexing devices powered from continuously rotating drive means usually incorporated an embodiment of the "Geneva movement" and it is one of the purposes of the invention to provide indexing structure which is superior in its characteristics over Geneva movement devices. The desired features of powered index devices of this nature include a smooth and definite indexing action wherein the beginning and the end of the rotation of the table be relatively slow that the apparatus upon the table not be subjected to abrupt jerks and stops. It is likewise important that the index table be accurate in the positioning of the table between indexing, that the table be versatile and rugged in its design and that the index table be of relatively simple structure which may be economically manufactured and maintained.

It is, therefore, an object of the invention to provide an index table powered from a unidirectionally rotating shaft wherein a positive and accurate positioning of the index table is provided and wherein the means locking the index table position is relatively independent from the means indexing the table.

A further object of the invention is to provide a power driven index device wherein a smooth indexing action is provided having a slow starting and stopping movement with a uniformly accelerating and decelerating motion.

Another object of the invention is to provide a power driven index table apparatus which is capable of supporting heavy loads upon the table and will maintain high accuracy throughout its operation.

Yet another object of the invention is to provide a power driven index table which is economical to manufacture, easy to maintain and adjust and which is dependable in operation.

Figure 2:
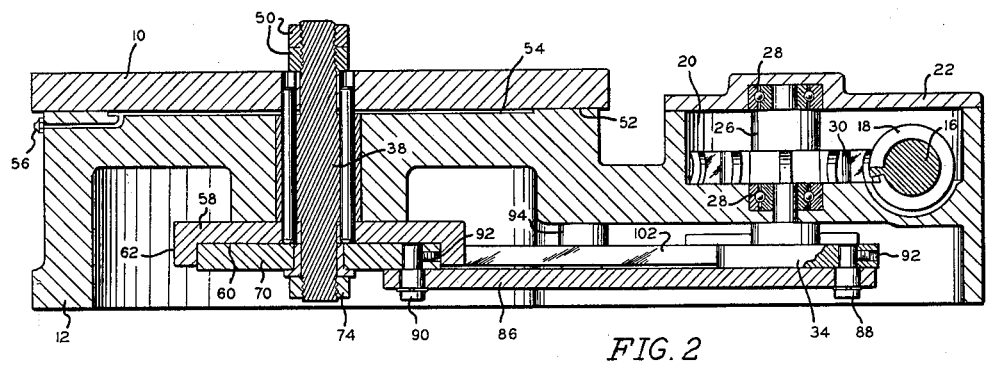
Figure 4:
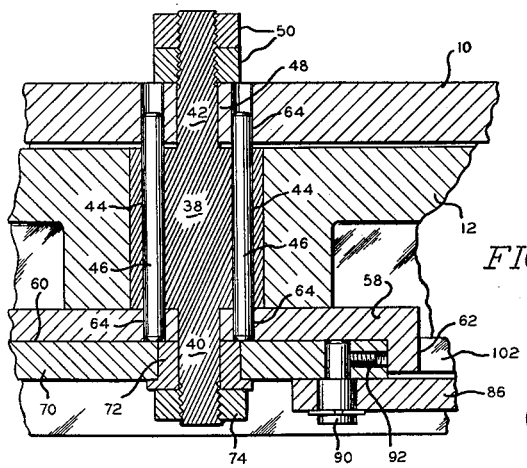
Figure 3:
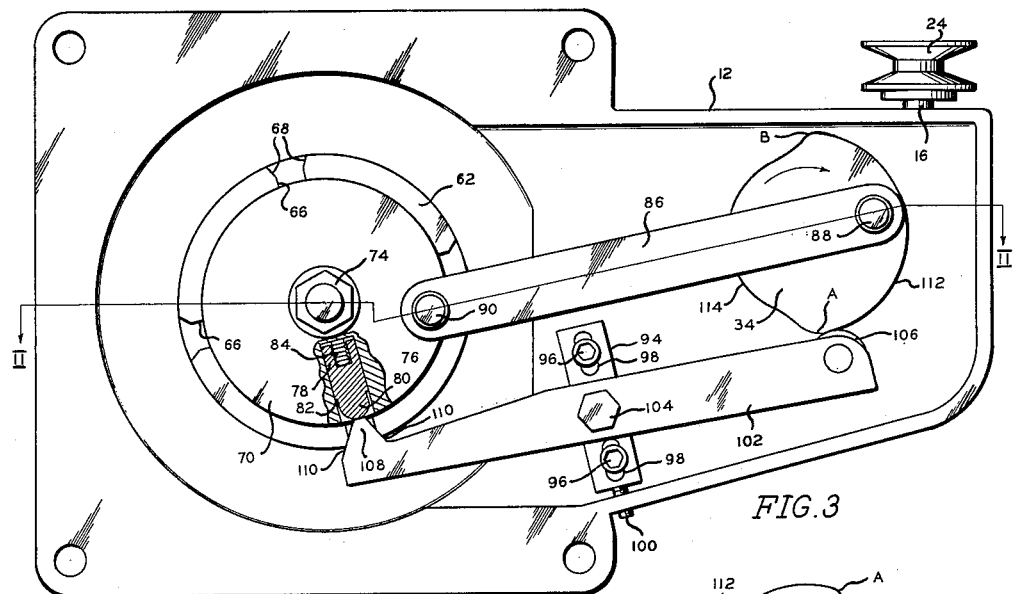
Figure 5:
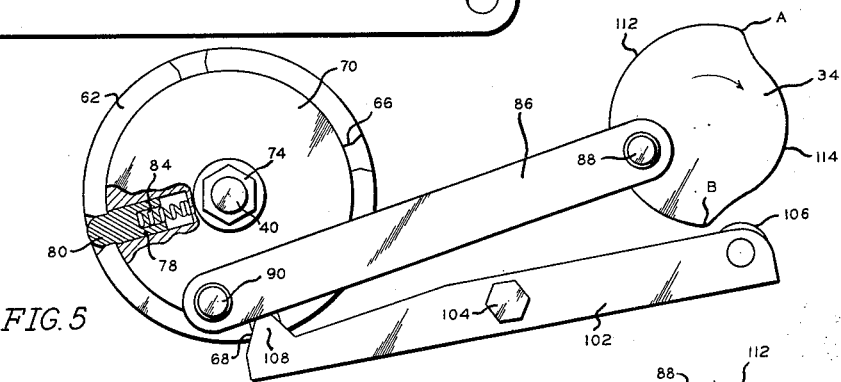
Figure 6:
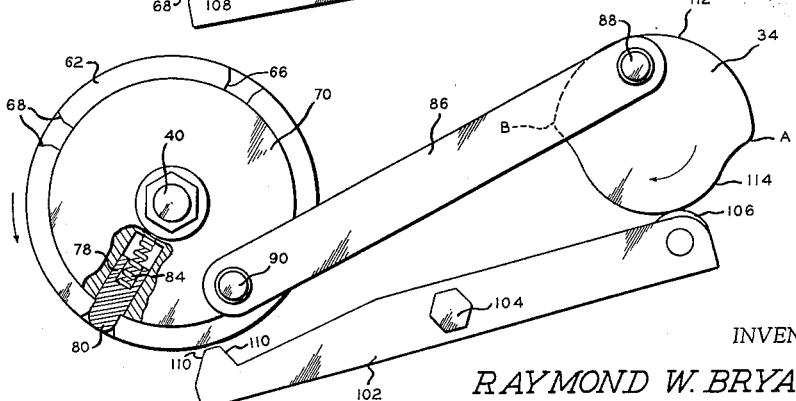

These and other objects of the invention arising from the details of the components of an embodiment thereof will be apparent from the following description and accompanying drawings wherein:

FIG. 1 is an elevational view of an index table in accord with the invention,

FIG. 2 is an elevational sectional view of the index table in accord with the invention as taken along section II—II of FIG. 3, FIG. 3 is a bottom view of the index table in accord with the invention, showing the clutch detent in section, FIG. 4 is an elevational detail sectional view of the index table shaft structure, FIG. 5 is a schematic bottom view of the index structure as shown at the beginning of the index table rotation, and FIG. 6 is a schematic view of the index structure, as shown during the indexing rotation of the table.

An index table in accord with the invention may take the form shown in FIG. 1 wherein the table 10 takes the form of a circular plate which is rotatably mounted upon a cast base 12. The base 12 is provided with suitable mounting holes 14 for receiving bolts whereby the index table base may be mounted upon the machine bed, assembly table or other device with which the table is being employed.

A shaft 16, FIG. 2, is rotatably mounted within the base 12 upon suitable bearings, not shown, and is provided with a worm gear 18 within the housing portion 20. The housing portion 20 comprises a recess formed within the base 12 enclosed by a cover 22 maintained in position by a plurality of screws or bolts. The shaft 16 has an end thereof extending from the base and this end is provided with a pulley 24 wherein the pulley may be drivingly connected to a power source by means of a belt. It will be understood that a chain sprocket may be substituted for the pulley 24 or, in some cases it may be desirable to directly drive the shaft 16 from a speed reducer output.

Referring to FIG. 2, a vertically disposed shaft 26 is mounted within the base 12 and cover 20 upon bearings 28 and is provided with a worm wheel 30 which is in mesh with the worm gear 18. The underside of the housing of the base 12 is recessed and the lower end of the shaft 26 extends into this recess and is provided at its lower end with a cam 34 affixed thereto having a peripheral control surface defined thereon.

Referring to FIGS. 2 and 4, the mounting for the index table will be described. The index table 10 is rotatably mounted upon the base 12 upon a rotatable shaft 38 having a lower end portion 40 and an upper end portion 42 of reduced diameter with respect to the central shaft region. A pair of parallel axially extending bores 44 are defined in the shaft 38 central region through which a pair of drive pins 46 are inserted for establishing a driving connection between the the index table and the lower index structure as will be later explained. The upper shaft end is threaded whereby upon inserting the shaft end 42 through a central bore 48 defined in the index table a pair of nuts 50 may be mounted upon the upper shaft end portion to prevent relative axial displacement between the table and shaft. The weight of index table 10 rests upon the annular planar thrust bearing surface 52 defined on the base 12. It will be noted that the bearing surface 52 engages the underside of the index table 10 near the outer regions of the table and that the base is recessed to provide a chamber 54 between the central portion of the index table and the base. The chamber 54 is intended to be filled with a lubricant through fitting 56 and the disclosed relationship has been found to be very successful in excluding dirt and other foreign matter from the thrust bearing support for the table and provides a heavy duty thrust bearing which is capable of accurately supporting the table under the heavy loads which may be imposed thereupon.

A dish-like index member 58 is mounted within the base bottom recess upon the lower end 40 of the shaft 38. The member 58 is of a circular configuration having a cylindrical recess 60 defined therein whereby an annular flange 62 is defined adjacent the periphery of the member. Member 58 is centrally provided with a bore into which the shaft portion 40 is received and a pair of holes 64 are defined in the member 58 and table 10 to receive the ends of pins 46 whereby the index member 58 and the index table 10 are keyed together for mutual rotation. As seen in FIGS. 3, 5 and 6, the flange 62 is provided with a plurality of radial slots 66 defined therein which extend through the flange. The outer ends of the slots 66 are provided with tapered surfaces 68 which cooperate with complementary wedge surfaces forming upon the table locking member as will be later apparent. It will be understood that the slots 66 could take the form of cylindrical holes bored through the flange having an outer tapered counter bore portion which would correspond to the tapered surfaces.

A detent carrying disc 70 of cylindrical planar configuration is rotatably mounted within the recess 60 of the index member 58 upon a bearing 72 which is mounted upon the shaft portion 40. A nut 74 threaded upon the lower shaft portion maintains the assembly of the components mounted thereon. The detent disc 70 is provided with a radially extending bore or guideway 76, FIG. 3, in which a spring biased detent 78 is reciprocally mounted. The detent 78 is provided with a head 80 which may be received within the slots 66 and a shoulder 82 is defined upon the detent to engage with the inner edges of the slots to limit the outward radial movement of the detent relative to the disc upon the alignment of the detent and slots. It will be appreciated that the spring 84, constantly biases the detent in an outward radial direction.

A connecting rod 86 interconnects the cam 34 and the detent disc 70 by means of a pair of pivot pins 88 and 90 which have stems which are received within bores within the respective members and set screws 92 maintain the pins within the bores. The pivot pins 88 and 90 include an enlarged portion on which the connecting rod 86 is mounted and snap rings maintain the rod upon the pins. It will be noted from FIGS. 3, 5 and 6 that the cam 34 and detent disc 70 are so related and the pivot pins of these components are mounted with respect to the axis of rotation of the cam and detent disc such that rotation of the pivot pin 88 about the axis of the shaft 26 causes the pivot pin 90 and detent disc 70 to oscillate about the axis of shaft 38. The number of index stations desired will determine the number of slots 66 formed in the index member flange 62 and, likewise, the number of stations will determine the degree of eccentricity of the pins 88 and 90 with respect to the axes of rotation of the cam 34 and disc 70, respectively.

A plate 94, FIG. 3, is mounted within the lower base recess upon the base by a pair of bolts 96 extending through slots 98 defined in the plate and a screw 100 extending through a side of the base engages the end of the plate whereby, upon loosening the bolts 96, the plate may be adjusted in the longitudinal direction of the slots 98 relative to the base. A locking lever 102 is pivotally mounted upon the plate 94 by a pivot pin 104 and is provided at one end with a cam follower roller 106 and at the other end with a wedge end 108 defined by a pair of converging surfaces 110 which are complementary in configuration to the wedge surfaces 68 defined upon the flange 62 associated with the slots 66.

The operation of the index table is as follows: As the shaft 16 is continuously rotated in a single direction by motor means, not shown, through the pulley 24, the cam 34 will likewise be rotated and the detent disc 70 will oscillate about the axis of shaft 38 due to the interconnection of the cam and detent disc through the connection rod 86. Assuming the cam to be rotating in the direction indicated by the arrow of FIG. 3, the positions of the components illustrated in FIG. 3 are those at the termination of the indexing movement of the index table wherein the cam roller 106 has just risen over the locking ridge A of the cam control surface and the cam is engaging the circular locking surface 112. The surface 112 is of such a radius that the lever 102 is pivoted to the position wherein the wedge surfaces 110 of the lever intimately engage with the wedge surfaces 68 of the slot and thereby lock the index member 58 and index table 10 against rotation. This relationship continues until the cam roller drops over the unlocking ridge B. It will be noted from FIG. 3 that upon the engagement of the wedge surfaces 68 and 110 the wedge end of 108 of the lever engages the outer end 80 of the detent 78, pushing the detent head from engagement with the associated slot 66. As the cam 34 continues to rotate from the position of FIG. 3 to the position of FIG. 5, the index table will be locked against rotation and during this time, the work will be taking place on the devices mounted upon the table. Simultaneously, the detent disc 70 will be rotating in the clockwise direction, as shown in FIGS. 3, 5 and 6 and the detent 78 will be maintained in the retracted postion by the inner surface of flange 62.

At the termination of the extreme clockwise movement of the detent disc 70, the detent guideway 76 will align with the slot 66 following the slot engaged by the lever wedge end 108, and the spring 84 will bias the detent head 80 into the slot to key the detent disc to the index member 58. At this time, or slightly before this instant, the cam roller 106 will pass over the unlocking ridge B and the components will be in the position shown in FIG. 5. Continued rotation of the cam 34 will cause the detent disc 70 and index member 58 to rotate in the counterclockwise direction and due to the camming action of the rear wedge end engaged wedge surface 68 the lever 102 will be pivoted such that the surfaces 110 leave the slot wedge surfaces 68. The pivoting of the lever 102 is permitted by the lesser radii of the cam surface 114 and continued rotation of the cam will oscillate the detent disc and index member in the counterclockwise direction, as shown in FIG. 6. It will be appreciated that it is not necessary during this time that the roller 106 engage the control surface 114. It is only necessary that the control surface 114 be of such radius as to permit the lever 102 to pivot to the position which completely removes the wedge end 108 from the slots 66 that the index member 58 may freely rotate.

Upon the slot 66, containing the detent head 80, reaching the position shown in FIG. 3, the cam follower roller 106 will ride over the locking ridge A onto the surface 112 causing the lever 102 to pivot in a clockwise direction which inserts the wedge end 108 into the slot and removes the detent head 80 therefrom and engages surfaces 68 and 110 as in FIG. 3. Upon the cam roller reaching the locking surface 112 the indexing cycle is completed and the above sequence will be repeated.

It will be appreciated that the relationships between the locations of the pivot pins 88 and 90 and the associated cam and detent disc is such that the movement of the detent disc during the time it is locked to the index member by the detent will be one of a slow starting motion and a slow stopping motion with the maximum angular velocity of the index member 58 taking place at a point intermediate these positions. The difference in the velocities transmitted to the detent disc result from the angular relationship between the radius connecting the axis of the pivot pin 88 and the axis of shaft 26 with the longitudinal axis of the connecting rod 86, e.g., as the radius connecting the pivot pin 88 and the axis of shaft 26 approach a parallel relationship to the longitudinal length of the connecting rod 86 rotation of the cam 34 a given degree produces little longitudinal movement of the rod and little rotation of the detent disc 70. However, maximum rotation of the detent disc will be achieved during rotation of the cam the same degree when the above mentioned relationship between the described radius and the longitudinal direction of the connecting rod is perpendicular.

In the illustrated embodiment an index table having four stations is shown and, hence, four slots 66 are employed and the disc 70 oscillates through 90°. The inventive concept may be employed with tables having 6, 8, 12, 24, etc. stations by employing more equally spaced slots 66 and varying the eccentricity of the pivot pin 88 that the disc 70 will be oscillated through an arc equal to the angular spacing of the slots.

A significant feature of the invention is the ability to very accurately compensate for wear and "play" which occur from wear by the adjustment of plate 94. Should the tapered surfaces 68 or the surfaces 110 wear such that a firm and positive connection between the lever and index member is not produced, the plate 94 may be positioned whereby the proper relationship between the locking surfaces is re-established and, hence, optimum performance and accuracy may be maintained at all times. The disclosed embodiment is capable of much greater accuracy of positioning than conventional devices employing Geneva movements.

It is understood that various embodiments of the invention may appear to those skilled in the art without departing from the spirit and scope thereof and it is intended that the invention be defined only by the following claims. While the inventive concepts have been described as employed with an index table, it will be appreciated that the index apparatus may find application with other devices wherein it is desired to index a member by the unidirectional rotation of a drive member.

I claim:

1. Indexing apparatus operated by a unidirectionally rotating drive shaft comprising, in combination, a housing, an index member rotatably mounted upon said housing, said member including a dish-like element having an axially extending peripheral flange, radial openings extending through said flange equally angularly spaced thereabouts, a driven member supported within said element and oscillatable thereto about the axis thereof, a radially movable detent mounted in said driven member engagable with said openings, spring means biasing said detent toward said flange, a linkage eccentrically pivotally operatively associated with said drive shaft and said driven member whereby rotation of said drive shaft oscillates said driven member in opposed first and second directions through an arc substantially equal to the angular spacing of said openings, a cam affixed to said drive shaft having a control surface, a lever pivotally mounted upon said housing, a cam follower mounted upon said lever engaging said control surface, a locking portion formed on said lever movable toward and away from said flange as said lever pivots, said locking portion being selectively received within one of said openings upon alignment thereof therewith, said detent engaging one of said openings during oscillation of said driven member in said first direction rotating said index member a like degree, said cam pivoting said lever locking portion into the opening containing said detent at the termination of oscillation of said driven member in said first direction, said locking portion removing said detent from the associated opening whereby said driven member may oscillate in said second direction relative to said element to engage the following opening at the termination of oscillation of said driven member in said second direction, said cam permitting removal of said locking portion from the associated opening during oscillation of said driven member in said first direction.

2. In an indexing apparatus as in claim 1 wherein said openings are formed with a tapered surface and said locking portion is provided with a complementary tapered surface.

3. Indexing apparatus operated by a unidirectionally rotating drive shaft comprising, in combination, support means rotatably mounting an index member, a driven member rotatably mounted on said support means concentric to said index member, drive means interconnecting said drive shaft and driven member whereby a revolution of said drive shaft oscillates said driven member in opposite first and second directions through a given arc, index means defined in a circle on said index member and angularly spaced apart substantially equal to said given arc, releasable means mounted on said driven member engaging said index means during oscillation of said driven member in said first direction and locking means operated in timed relation to the rotation of said drive shaft selectively engaging said index member to lock said index member against rotation, said locking means disengaging said releasable means from said index means upon engagement of said locking means with said index member and means releasing said locking means from said index member during oscillation of said driven member in said first direction.

4. Indexing apparatus operated by a unidirectionally rotating drive shaft comprising, in combination, support means supporting a rotatably mounted index member, a driven member rotatably mounted on said support means concentric to said index member, linkage means eccentrically and pivotally, operatively connected with said drive shaft and said driven member imparting an oscillation to said driven member upon rotation of said drive shaft, key means mounted upon said driven member selectively engagable with said index member in driving relationship thereto, lock means selectively engaging said index member for preventing the rotation thereof, lock actuation means operatively connected to and actuated by said drive shaft actuating said lock means, said lock means disengaging said key means from said index member upon said lock means engaging said index member.

5. Indexing apparatus operated by a unidirectionally rotating drive shaft comprising, in combination, support means supporting a rotatably mounted index member, a driven member rotatably and concentrically mounted relative to said index member, a rigid linkage eccentrically, pivotally, operatively connected with said drive shaft and eccentrically, pivotally mounted upon said driven member such that rotation of said drive shaft oscillates said driven member, releasable key means drivingly interconnecting said driven member and index member during oscillation of said driven member in a given direction, lock means selectively engaging said index member preventing rotation thereof, lock actuating control means mounted upon said drive shaft oscillating said lock means and releasing said index member during oscillation of said driven member in said given direction, said lock means directly releasing said key means from said index member at the termination of the oscillation of said driven member in said given direction.

References Cited in the file of this patent

UNITED STATES PATENTS

| | | |
|---|---|---|
| 795,095 | Benoit et al. | July 18, 1905 |
| 801,744 | Schilbach | Oct. 10, 1905 |
| 1,058,922 | Tassey | Apr. 15, 1913 |
| 1,168,091 | Maughner | Jan. 11, 1916 |
| 2,201,798 | Scott et al. | May 21, 1940 |